Patented Jan. 11, 1949

2,458,679

UNITED STATES PATENT OFFICE 2,458,679

PREPARATION OF VITAMIN-FORTIFIED MEALS

Loran O. Buxton, Maplewood, N. J., assignor to Nopco Chemical Company, a corporation of New Jersey No Drawing. Application June 3, 1946, Serial No. 674,030

20 Claims. (Cl. 99—11)

This invention relates to methods for preparing free-flowing vitamin-containing vegetable meals and to the meals prepared thereby, and is a continuation-in-part of copending application Serial No. 528,355 now Patent No. 2,426,486, filed March 27, 1944, by Buxton and Dryden, and my copending application Serial No. 674,031 filed concurrently herewith.

Fat-soluble vitamin-containing materials as, for example, cod liver oil, sardine oil, etc., have commonly been incorporated into poultry and animal fats in order to fortify such fats with vitamins A and D. However, these preparations were found to be readily susceptible to deteriorative oxidation and destruction of the vitamin content. Therefore, it was usually necessary to mix the vitamin-containing material with a stock feed such as a vegetable meal only shortly before feeding stock in order to provide feeds of proper vitamin potency. In employing various oils as sources of vitamins, the product was usually an oily meal of an unpalatable nature. Whenever the added oil was in excess of 5 or 6%, the meal particles were unctuous in nature and readily tended to cake thereby rendering mixing difficult. In addition, the oil on the exterior surfaces of the meal particles was subject to the destruction of its vitamin content by oxidation.

Various proposals have been made for producing stable vitamin-containing materials of high potency in a dry, granular form but little success has been attained along this line. Some of the suggestions of this nature related to incorporating fish liver oils in molten paraffin or gums and impregnating vegetable matter with the mixture whereby the vitamin-containing oils were inclosed in a film of wax or gum upon cooling. Such products did not prove to be very stable as regards the protection of vitamin material and the use of waxes and gums was undesirable from a physiological standpoint. The waxes and gums not only were not assimilable by animal bodies but also interfered with the assimilation of vitamins contained therein.

In the copending application of Buxton and Konen Serial No. 442,079, filed May 7, 1942, now Patent 2,401,293, a dry carrier with a nonunctuous exterior is prepared by treating vegetable materials with a vitamin-concentrate admixed with crude vegetable oils. While this method has attained considerable success, it is to be noted that it is limited to the preparation of materials having a total fat content not in excess of 30%. Moreover, this process does not provide for the formation or liberation of certain antioxidant substances in vegetable meals in the manner disclosed in Patent 2,426,486.

An object of the present invention is the preparation of free-flowing, vitamin-containing vegetable meals of substantial oleaginous content.

A second object of the invention is the reduction or elimination of oiliness from the exterior of particles of vitamin-containing vegetable meals of substantial oleaginous vitamin content.

A third object of the invention is the preparation of stabilized, dry, vitamin-containing vegetable meals containing substantial proportions of oleaginous matter.

A fourth object of the invention is the preparation of vitamin-containing vegetable meals of substantial oleaginous content and improved oxidation-resisting properties.

A fifth object of the invention is to provide a method for incorporating vitamin-containing oils into vegetable meals of high oleaginous content.

Another object of the invention is the preparation of vegetable meals of increased vitamin potency.

Other objects of the invention will in part be obvious and will in part appear hereinafter.

The present invention concerns the treatment of vegetable meals and vitamin-containing oils with ammonia and a solvent miscible with the oils. Thereafter the ammonia and solvent are separated from the mixture of meal and vitamin oil. This operation is usually accomplished by volatilizing the ammonia and solvent at a moderate temperature as, for example, by air-drying.

In order to increase the vitamin potency of edible vegetable meals, it is highly desirable to be able to add more than 5 or 6% of oils containing fat-soluble vitamins to the meals and still have a free-flowing product. Meals which will flow in this manner are composed of particles which at least appear to have dry, nonunctuous surfaces. However, surfaces having only slight traces of oiliness, while not dry, are substantially nonunctuous and free-flowing. In my copending application Serial No. 674,031 is disclosed a method of substantially eliminating surface oiliness from oil-bearing vegetable meals having less than 50% content of fatty material. In the present invention, this method is utilized in conjunction with the addition of vitamin-containing oils to vegetable meals to yield an edible meal of enhanced vitamin potency and increased resistance to oxidation. When the total oleaginous content, including the added vitamin oil, of the product exceeds 50% of the total weight, the resulting product cannot be said to be free-flowing and nonunctuous in character, although the surface oiliness and caking tendencies of the material are greatly reduced by the treatment. By this improved process it is possible to obtain from the vegetable matter products of high vitamin content. The treatment is expedited by heating but is operative at any temperature above the congealing point of the liquid mixture. However, the use of temperatures above the boiling point of the solvent or above about 100° C. is undesirable as it causes excessive losses of ammonia and solvent. In addition, a partial decomposition of many vegetable meals occurs at temperatures above 100° C. Good results have been obtained in carrying out the mixing for one hour at 50° to 60° C.

Since the products possess utility in the preparation of foods for poultry, livestock and human beings, the meal should be selected from the cereal grains or other appropriate sources containing no constituents harmful to animal life, and preferably including considerable quantities of materials of nutritive value. Suitable meals include, inter alia, those obtained from cottonseed, maize, flaxseed, sesame seed, soya beans, peanuts, copra, cocoa beans, wheat germ, corn germ, barley, oats, rye, wheat, alfalfa, rice bran, palm kernels, dried grass, and all types of edible nuts. The fineness to which the meal is ground is a matter of choice as the treatment is operative on any vegetable material not covered by an impermeable coating. Coarse particles will require a somewhat longer mixing with the treating liquid, and a considerable expenditure of power is required in grinding very fine meals. In general, the employment of meals which will pass through any screen in the range from 40–100 mesh is recommended.

The ammonia may be utilized in any form; accordingly, it is to be understood that the term "ammonia" is used herein in the generic sense to denote ammonia gas ($NH_3$), liquid ammonia and ammonia dissolved in water or any other suitable solvent. In employing gaseous or liquid ammonia, suitable pressure vessels or artificially cooled equipment will be required. The preferred and most convenient method of contacting the raw materials with ammonia is in the form of a concentrated ammonium hydroxide solution containing approximately 28% by weight. The quantity of active $NH_3$ used in the present process may vary very widely and from a considerable number of experiments it has been found that the attributes of the product of this invention may be realized in at least some degree when 1000 parts by weight of the mixture of vegetable meal and vitamin oil are treated with from 1 to 100 parts by weight of $NH_3$, corresponding to 3 to 350 parts of concentrated ammonium hydroxide. However, the preferred proportions are in the range of 5 to 50 parts of $NH_3$, which is equivalent to 18 to 180 parts by weight of concentrated ammonium hydroxide, for 1000 parts of the combination of meal and vitamin oil.

Appropriate solvents comprise organic solvents which are miscible with or dissolve the major portion, and preferably all, of the oils and fatty constituents in the vitamin-containing oil and the meal to be treated. Further, the solvent must be compatible with ammonia; that is, not react with ammonia. The solvent may consist of a single chemical compound or a mixture of several of these. Suitable solvents for the instant method include, inter alia, hexane, heptane, octane, ethylene dichloride, trichlorethylene, carbon tetrachloride, cyclohexane, methyl cyclohexane, benzene, acetone, isopropanol, diacetone alcohol, and the like. It must be realized that the performance of these substance varies considerably. Experiments carried out to date have indicated acetone to be highly superior for the present purposes to the other compounds listed. While it is preferable to select a solvent of substantial volatility at room temperature in order to expedite the air-drying step, this is not essential as the solvent can be vaporized by heating and/or at reduced pressures. It is necessary that the solvent be one which can be evaporated at temperatures below those which cause decomposition of the vegetable meal.

A solvent mixture may include a substance immiscible with fatty materials, provided that a solvent of the class defined above is also present. In such cases the proportion of such fat-immiscible ingredient must be kept low enough to not appreciably affect the miscibility or solvent power of the solvent mixture in respect to fatty materials. Examples of the type of ingredient mentioned include the lower alcohols as, for instance, methanol, ethanol, propanol, etc. The action of these alcohols is not understood but their incorporation into a solvent mixture in minor amounts appears to increase the activeness of the treatment of certain vegetable meals. It is to be noted that these alcohols are all highly polar, and this feature may have some bearing on their effect in the solvent mixture.

The quantity of solvent to be employed depends almost entirely on the quantity of vegetable meal present. For each 100 parts by weight of vegetable meal, a minimum of about 8 parts by weight of the solvent is required. Large excesses of solvent may be added, but this practice merely increases the cost of processing and lengthens the time required for drying. In general, the preferred range is from 20 to 60 parts by weight of solvent for each 100 parts of meal which produces economical mixtures which are usually of readily kneadable consistency. The preferred consistency of the mass is of the character of wet mush, that is, a plastic mass rather than a slurry capable of being poured.

Any suitable natural or synthetic material rich in any one or more of the fat-soluble vitamins, e. g., A, D, E and K, may be used in producing the products of the invention, the corresponding provitamins being included under the generic expression "vitamins." It is preferred to use animal, vegetable or fish oils rich in the fat-soluble vitamins, such as cod liver oil, shark liver oil, halibut oil, sardine oil, tuna oil, tuna liver oil, palm and like oils, concentrates thereof, or such oils fortified with vitamin concentrates. Other sources of the fat-soluble vitamins such as antirachitic activated sterols and the like may also be used either alone or in combination with any of the aforementioned or other vitamin-containing materials. The quantity of the vitamin-containing oil to be added to the vegetable meal is a matter of choice, subject to the rule that a free-flowing product whose particles have a substantially nonunctuous exterior cannot be obtained where the sum of the original fatty content of the meal and that of the vitamin oil exceeds 50% of the weight of the product.

For a fuller understanding of the nature and objects of the invention, reference should be had to the following examples which are given merely to further illustrate the invention and are not to be construed in a limiting sense, all parts given being by weight. It will be noted that the properties and characteristics of the products of Examples I to XIV, inclusive, are set forth in Tables 1 and 2 rather than in the examples themselves.

EXAMPLE A

A soupfin shark liver oil having a vitamin A content of 41,200 U. S. P. units per gram as determined by saponifying the oil thereby concentrating all of the vitamin A material in the unsaponifiable portion and analyzing this portion of the oil.

EXAMPLE B

A processed oil with a vitamin A content ascertained to be 417,000 U. S. P. units per gram by the analytical procedure of Example A.

This oil was produced in accordance with the process of my copending application Serial No. 450,757, filed July 13, 1942, now Patent 2,412,766. Soupfin shark oil was saponified to 85% of its saponification value, and the unsaponifiable portion was extracted from the saponified mass by using ethylene dichloride which was thereafter distilled off from the unsaponifiable matter. This unsaponifiable matter was treated with methanol at a low temperature, and the methanol fraction containing the vitamin A alcohols was drawn off. The residue was an oil containing the vitamin A esters and constituted the processed oil of this example.

EXAMPLE C

A fish liver oil consisting of equal portions by weight of the liver oils of soupfin sharks and dogfish. The vitamin A potency was found to be 67,600 U. S. P. units per gram of oil by the same procedure used in Example A.

EXAMPLE I

*Raw materials*

| | Grams |
|---|---|
| Vitamin oil of Example A | 120 |
| Wheat germ flour (sieved) | 250 |
| Expeller linseed oil meal | 630 |
| | 1,000 |

*Treating agents*

None.

The two meals were placed in a small Read mixer, which is similar to the type of mixer employed for kneading dough. As soon as the mixture was uniform, the oil was added slowly. The mass was then mixed for one hour at room temperature and without the use of a condenser.

Since this was a blank or control sample, for purposes of comparison, the mass was given no further treatment.

EXAMPLE II

*Raw materials*

Same as in Example I.

*Treating agents*

| | Grams |
|---|---|
| Concentrated ammonium hydroxide (28% NH₃) | 45 |
| Acetone | 400 |

The oil was poured into a 1-liter flask containing the wheat germ flour and acetone. After thoroughly shaking the mixture, the ammonium hydroxide was added, and the mass slowly refluxed for one hour in an atmosphere of nitrogen. As the mixing of the solvent and meal proved unsatisfactory, the mass was transferred to a Read mixer. The linseed meal was added and the mixer operated for one hour at room temperature. Then the mass was air-dried, and the few lumps were broken up with a spatula.

EXAMPLE III

*Raw materials*

Same as in Example I.

*Treating agents*

| | Grams |
|---|---|
| Conc. ammonium hydroxide (28%) | 22.5 |
| Acetone | 400 |

In this, and in all subsequent examples, unless otherwise stated, the Read mixer was equipped with a vapor condenser and heated to approximately 50° C. by passing hot water through the water jacket. The two meals and acetone were mixed to uniformity; then the oil was poured onto the moist meal. After mixing for one or two minutes, the ammonia was added and the mixer operated for one hour. After air-drying, the product was passed through a 10 mesh sieve to break up lumps.

EXAMPLE IV

*Raw materials*

Same as in Example I.

*Treating agents*

| | Grams |
|---|---|
| Conc. ammonium hydroxide (28% NH₃) | 90 |
| Acetone | 400 |

The procedure differed from that of Example III only in regard to the use of a larger amount of ammonia.

EXAMPLE V

*Raw materials*

Same as in Example I.

*Treating agents*

| | Grams |
|---|---|
| Acetone | 400 |

The procedure employed was identical with that of Example III, except that no ammonia was used in this blank or control experiment.

EXAMPLE VI

*Raw materials*

| | Grams |
|---|---|
| Vitamin oil of Example A | 120 |
| Expeller linseed oil meal | 880 |
| | 1,000 |

*Treating agents*

None.

This was a blank sample for comparison with Example VII. The oil was poured slowly into the meal being stirred in the mixer. Mixing was continued for an hour at room temperature.

EXAMPLE VII

*Raw materials*

Same as in Example VI.

*Treating agents*

| | Grams |
|---|---|
| Conc. ammonium hydroxide (28%) | 45 |
| Acetone | 400 |

The meal was dumped into the mixer and the oil, acetone and ammonia were added in succession. After the kneading had been continued for one hour without heating, the product was removed and dried in the air.

EXAMPLE VIII

Raw materials

| | Grams |
|---|---|
| Vitamin oil of Example A | 250 |
| Wheat germ flour (sieved) | 250 |
| Expeller linseed oil meal | 500 |
| | 1,000 |

Treating agents

| | Grams |
|---|---|
| Conc. ammonium hydroxide (28% NH₃) | 90 |
| Acetone | 400 |

After mixing the two meals with the acetone, the resulting mass was wet but not fluid. The addition of the vitamin oil made the mixture so fluid that it could be poured. Upon addition of the ammonium hydroxide, the mass immediately lost its fluidity and became granular. Thereafter, the wet meal was kneaded for one hour in the mixer, air-dried, and screened through a 10 mesh sieve to reduce the lumps.

EXAMPLE IX

Raw materials

| | Grams |
|---|---|
| Vitamin oil of Example A | 400 |
| Wheat germ flour | 300 |
| Expeller linseed oil meal | 300 |

Treating agents

| | Grams |
|---|---|
| Conc. ammonium hydroxide (28% NH₃) | 90 |
| Acetone | 400 |

The procedure of Example VIII was followed.

EXAMPLE X

Raw materials

| | Grams |
|---|---|
| Vitamin oil of Example A | 400 |
| Expeller linseed oil meal | 600 |
| | 1,000 |

Treating agents

| | Grams |
|---|---|
| Conc. ammonium hydroxide (28% NH₃) | 90 |
| Acetone | 400 |

The procedure was the same as that of Example VIII.

EXAMPLE XI

Raw materials

| | Grams |
|---|---|
| Vitamin oil of Example B | 300 |
| Wheat germ flour (sieved) | 350 |
| Expeller linseed oil meal | 350 |
| | 1,000 |

Treating Agents

| | Grams |
|---|---|
| Conc. ammonium hydroxide (28% NH₃) | 135 |
| Actone | 400 |

The procedure of Example VIII was employed.

EXAMPLE XII

Raw materials

| | Grams |
|---|---|
| Vitamin oil of Example C | 100 |
| Black soybean meal (finely ground) | 900 |
| | 1,000 |

Treating agents

None.

This was a control sample so the only treatment consisted of mixing the oil and meal in a Read mixer for one hour at room temperature.

EXAMPLE XIII

Raw materials

Same as in Example XII.

Treating agents

| | Grams |
|---|---|
| Conc. ammonium hydroxide (28% NH₃) | 45 |
| Acetone | 400 |

The oil, acetone and ammonia were added successively to the meal being kneaded in the mixer. Mixing was continued for one hour at approximately 50° C.; then the mass was air-dried.

EXAMPLE XIV

Raw materials

| | Grams |
|---|---|
| Vitamin oil of Example C | 100 |
| Flaxseed meal (finely ground) | 900 |
| | 1,000 |

The original oil content of the flaxseed meal was found to be 40.4% by weight. The vitamin oil was added to the meal with the mixer operating. After 30 minutes of mixing, it was apparent that the meal was absorbing little or none of the vitamin oil. The mass was very oily and formed lumps or balls.

Treating agents

| | Grams |
|---|---|
| Conc. ammonium hydroxide (28% NH₃) | 67.5 |
| Acetone | 400 |
| Methanol | 80 |

A mixture of the treating agents was added to the oil-meal mass. After mixing for one hour at about 50° C., the treated product was air-dried to remove the treating agents.

TABLE 1

| Example | Vit. A Oil Added, Grams | Wheat Germ Flour, Grams | Linseed Meal, Grams | Soy Bean Meal, Grams | Flax Seed Meal, Grams | Acetone, Grams | NH₄OH, Grams | Total Fats in Product, Percent | Surface Oiliness of Product |
|---|---|---|---|---|---|---|---|---|---|
| I | 120 | 250 | 630 | 0 | 0 | 0 | blank | 17.5 | oily, caked easily. |
| II | 120 | 250 | 630 | 0 | 0 | 400 | 45.0 | 17.5 | very slightly oily, free-flowing. |
| III | 120 | 250 | 630 | 0 | 0 | 400 | 22.5 | 17.5 | dry, nonoily. |
| IV | 120 | 250 | 630 | 0 | 0 | 400 | 90.0 | 17.5 | very dry, nonoily. |
| V | 120 | 250 | 630 | 0 | 0 | 400 | blank | 17.5 | same as I, much oilier than III and IV. |
| VI | 120 | 0 | 880 | 0 | 0 | 0 | blank | | very oily, caked heavily. |
| VII | 120 | 0 | 880 | 0 | 0 | 400 | 45.0 | | dry, nonoily. |
| VIII | 250 | 250 | 500 | 0 | 0 | 400 | 90.0 | 30.0 | Do. |
| IX | 400 | 300 | 300 | 0 | 0 | 400 | 90.0 | 44.7 | similar to I, but somewhat free-flowing. |
| X | 400 | 0 | 600 | 0 | 0 | 400 | 90.0 | 44.5 | less oily than I and IX, fairly free-flowing. |
| XI | 300 | 350 | 350 | 0 | 0 | 400 | 135.0 | 35.3 | dry, nonoily. |
| XII | 100 | 0 | 0 | 900 | 0 | 0 | blank | 26.0 | oily, caked easily. |
| XIII | 100 | 0 | 0 | 900 | 0 | 400 | 45.0 | 26.0 | dry, nonoily. |
| XIV | 100 | 0 | 0 | 0 | 900 | ¹ 480 | 67.5 | 47.0 | slightly oily, free-flowing. |

¹ Mixture of 400 grams acetone and 80 grams methanol.

In considering the data in Table 1, it will immediately be noted that surprising quantities of oil, ranging up to about 50% of the total weight, can be incorporated into vegetable meals by the present process.

All of the ammonia-solvent-treated products are of free-flowing character whereas the untreated blank samples of Examples I, V, VI and XII of similar or lower fatty content are meals with unctuous coatings which readily cake.

The present method is not a mere washing of surface oil from the particles of meal as evidenced by the product of Example V which had the same characteristics as the control sample of Example I despite the addition of a solvent but no ammonia to the mix.

Example XIV is of interest in showing that the ammonia-solvent treatment in some manner affects the structure or composition of the vegetable matter. In this case, oil, which the untreated flaxseed meal was incapable of absorbing prior to the treatment, was readily absorbed in the presence of a mixture of ammonia, acetone and methanol into the interior of the meal particles.

It was distinctly surprising to find the treated product free-flowing and possessing only slight surface oiliness.

TABLE 2

| Example | Vit. A Oil Added, Grams | Vit. A Oil Potency USP units per gram | NH₄OH, grams | Total Fats in product, per cent | Product Vit. A Potency per gram | Per cent Vitamin A Destroyed in Product at 30° C. | | | |
|---|---|---|---|---|---|---|---|---|---|
| | | | | | | 1 mo. | 1½ mo. | 2 mo. | 3 mo. |
| I | 120 | 41,200 | blank | 17.5 | 4,900 | 8.6 | 7.4 | 7.2 | 17.8 |
| II | 120 | 41,200 | 45.0 | 17.5 | 4,600 | 6.5 | 3.9 | 9.1 | 10.2 |
| III | 120 | 41,200 | 22.5 | 17.5 | 4,780 | | | 11.9 | 13.4 |
| IV | 120 | 41,200 | 90.0 | 17.5 | 4,770 | | | 9.4 | 12.6 |
| V | 120 | 41,200 | blank | 17.5 | 4,500 | | | 18.0 | 30.7 |
| VI | 120 | 41,200 | blank | | 4,710 | [1] 28.3 | | 58.0 | |
| VII | 120 | 41,200 | 45.0 | | 4,740 | [1] 17.1 | | 0 | |
| VIII | 250 | 41,200 | 90.0 | 30.0 | 9,300 | | | 11.5 | |
| IX | 400 | 41,200 | 90.0 | 44.7 | 15,400 | | | | |
| X | 400 | 41,200 | 90.0 | 44.5 | 15,400 | | | | |
| XI | 300 | 417,000 | 135.0 | 35.3 | 115,000 | | | | |
| XII | 100 | 67,600 | [blank | 26.0 | 6,480 | | | | |
| XIII | 100 | 67,600 | 45.0 | 26.0 | 6,440 | | | | |
| XIV | 100 | 67,600 | 67.5 | 47.0 | 6,470 | | | | |

[1] Test conducted at 50° C. instead of 30° C.

As appears in Table 2, the products of this invention are more stable in respect to maintaining their vitamin potency for substantial periods than the blank or control samples. This is especially evident from the column setting forth the loss of vitamin content after 3 months at 30° C.

It should be noted that the treated meal of Example VII shows a striking improvement over the control sample of Example VI in maintenance of vitamin potency.

While a sample produced by the procedure of Example VIII shows a larger loss of vitamin content than the product of Example I after aging for 2 months at 30° C., the control sample in this instance is not thought to furnish an adequate comparison in view of its vitamin oil content of less than half that of Example VIII. In general, it is evident that the new products are of greater stability in respect to effective vitamin A content.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention which, as a matter of language, might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having described my invention, what I claim as new and desire to secure by Letters Patent is:

1. A process for preparing a free-flowing, oxidation-resistant, vitamin-fortified, edible vegetable meal which comprises thoroughly impregnating an edible vegetable meal by mixing therewith an oil containing fat-soluble vitamin material, ammonia and a solvent compatible with ammonia and miscible with a substantial proportion of the oleaginous matter in the mixture, said vitamin-containing oil being added in such quantity that the total quantity of oleaginous matter in the combined meal and vitamin-containing oil does not exceed 50% of the total weight of vegetable meal and vitamin-containing oil, and removing the ammonia and said solvent from the meal in such manner that substantially all of the oleaginous matter remains with the meal.

2. The process of claim 1 in which about 1 to 100 parts by weight of ammonia are used for each 1000 parts of vegetable meal and vitamin-containing oil in the mixture, and at least 8 parts by weight of solvent are used for each 100 parts of untreated vegetable meal.

3. The process of claim 1 in which about 5 to 50 parts by weight of ammonia are used for each 1000 parts of vegetable meal and vitamin-containing oil in the mixture, and at least 8 parts by weight of solvent are used for each 100 parts of untreated vegetable meal.

4. The process of claim 1 in which about 1 to 100 parts by weight of ammonia are used for each 1000 parts of vegetable meal and vitamin-containing oil in the mixture, and the solvent comprises at least 8 parts by weight of acetone for each 100 parts of untreated vegetable meal.

5. The process of claim 1 in which about 1 to 100 parts by weight of ammonia are used for each 1000 parts of vegetable meal and vitamin-containing oil in the mixture, and the solvent comprises at least 8 parts by weight of a blend of acetone and methanol for each 100 parts of untreated vegetable meal.

6. The process of claim 1 in which about 5 to 50 parts by weight of NH₃ in concentrated aqueous solution are used for each 1000 parts of vegetable meal and vitamin-containing oil in the mixture, and at least 8 parts by weight of said solvent are used for each 100 parts of untreated vegetable meal.

7. The process of claim 1 in which about 5 to 50 parts by weight of NH₃ in concentrated aqueous solution are used for each 1000 parts of vegetable meal and vitamin-containing oil in the mixture, and the ammonia and said solvent are removed from the treated mass by evaporation.

8. The process of claim 1 in which about 5 to 50 parts by weight of NH₃ in concentrated aqueous solution are used for each 1000 parts of vegetable meal and vitamin-containing oil in the mixture, and the ammonia and said solvent are removed from the treated mass by air-drying.

9. The process of claim 1 in which the vitamin-containing oil comprises from 10 to 40% of the total weight of vegetable meal and vitamin-containing oil.

10. The process of claim 1 in which the vegetable meal comprises wheat germ meal.

11. The process of claim 1 in which the vegetable mean comprises linseed oil meal.

12. The process of claim 1 in which the vegetable meal comprises flaxseed meal.

13. A composition of matter which comprises a fat-solvent and ammonia-treated, oil-bearing, vitamin-fortified, edible vegetable meal containing a substantial quantity of an added fat-soluble vitamin-containing oil, the total content of oleaginous matter being less than 50% of the weight of the meal, and the exterior surfaces of individual particles of the meal being substantially nonunctuous, whereby the meal is of substantially free-flowing character and resistant to loss of vitamin content.

14. A composition of matter which comprises a fat-solvent and ammonia-treated, oil-bearing, vitamin-fortified, edible vegetable meal containing from 5 to 40% by weight of an added fat-soluble vitamin-containing oil, the total content of oleaginous matter being less than 50% of the weight of the meal, and the exterior surfaces of individual particles of the meal being substantially nonunctuous, whereby the meal is of substantially free-flowing character and resistant to loss of vitamin content.

15. A composition of matter which comprises a vitamin-fortified, edible vegetable meal containing 5 to 40% by weight of an added fat-soluble, vitamin-containing oil, the total content of oleaginous matter amounting to 30 to 50% of the weight of the meal, and the exterior surfaces of individual particles of the meal being substantially nonunctuous, whereby the meal is of substantially free-flowing character and resistant to loss of vitamin content.

16. A composition of matter which comprises an acetone-ammonia-treated, vitamin-fortified, edible vegetable meal containing 10 to 40% by weight of a fat-soluble vitamin oil of external origin, having substantially the entire content of oleaginous matter distributed in the interior of individual particles of the meal, said entire content of oleaginous matter being not over 50% of the weight of the meal, and the exterior surface of individual particles of meal being substantially nonunctuous, whereby the meal is substantially free-flowing and resistant to loss of vitamin content.

17. The composition of matter of claim 14 in which the vegetable meal comprises wheat germ meal.

18. The composition of matter of claim 14 in which the vegetable meal comprises linseed oil meal.

19. The composition of matter of claim 14 in which the vegetable meal comprises flaxseed meal.

20. A composition of matter prepared by the method set forth in claim 1.

LORAN O. BUXTON.

REFERENCES CITED

The following references are of record in the file of this patent:

UNITED STATES PATENTS

| Number | Name | Date |
|---|---|---|
| 1,850,095 | Dengler | Mar. 22, 1932 |
| 2,345,571 | Briod et al. | Apr. 4, 1944 |